United States Patent
Perkins et al.

(10) Patent No.: US 8,439,445 B2
(45) Date of Patent: May 14, 2013

(54) VEHICLE SEAT BACKS

(75) Inventors: Graham Perkins, Telford (GB); Stuart Joseph Whitmore, Solihull (GB)

(73) Assignee: Johnson Controls Automotive (UK) Limited (GB)

( * ) Notice: Subject to any disclaimer, the term of this patent is extended or adjusted under 35 U.S.C. 154(b) by 696 days.

(21) Appl. No.: 12/304,928

(22) PCT Filed: Jun. 15, 2007
(Under 37 CFR 1.47)

(86) PCT No.: PCT/EP2007/005295
§ 371 (c)(1),
(2), (4) Date: Feb. 18, 2010

(87) PCT Pub. No.: WO2007/144191
PCT Pub. Date: Dec. 21, 2007

(65) Prior Publication Data
US 2010/0213746 A1    Aug. 26, 2010

(30) Foreign Application Priority Data
Jun. 16, 2006   (GB) .................................. 0612167.7

(51) Int. Cl.
*B60N 2/02* (2006.01)
(52) U.S. Cl.
USPC ............... 297/378.13; 297/378.1; 297/378.12
(58) Field of Classification Search ............... 297/378.1, 297/378.13
See application file for complete search history.

(56) References Cited

U.S. PATENT DOCUMENTS

| | | | | |
|---|---|---|---|---|
| 5,692,803 A | * | 12/1997 | Luik et al. | 297/378.12 |
| 6,705,679 B1 | * | 3/2004 | Zelmanov et al. | 297/378.13 |
| 6,811,199 B2 | * | 11/2004 | Nozaki | 296/63 |
| 7,377,584 B2 | * | 5/2008 | Griswold et al. | 297/216.12 |
| 2004/0046434 A1 | * | 3/2004 | Zelmanov et al. | 297/378.13 |
| 2005/0062327 A1 | | 3/2005 | Griswold et al. | |

FOREIGN PATENT DOCUMENTS

| | | |
|---|---|---|
| DE | 19857947 A1 | 6/2000 |
| EP | 0741055 A2 | 11/1996 |
| FR | 2 780 353 A1 | 12/1999 |
| FR | 2780353 A1 | 12/1999 |

(Continued)

OTHER PUBLICATIONS

International Search Report from PCT/EP2007/005295.

(Continued)

*Primary Examiner* — David Dunn
*Assistant Examiner* — Erika Garrett
(74) *Attorney, Agent, or Firm* — Foley & Lardner LLP

(57) ABSTRACT

In the field of vehicle seats there is a need for an improved vehicle seat back tilt adjustment assembly that allows a user selectively to make small or large adjustments to the inclination of a vehicle seat back. A vehicle seat back tilt adjustment assembly comprises a guide member securable to a vehicle body; and an intermediate mechanism moveably coupled to the guide member. The intermediate mechanism includes first and second locking elements. The first locking element is moveable between a first configuration in which it is engagable with a vehicle seat back to secure the seat back to the intermediate mechanism and a second configuration in which the seat back is disengagable therefrom to allow the seat back to move independently of the intermediate mechanism. The second locking element selectively engages the guide member to secure the position of the intermediate mechanism relative to the guide member.

15 Claims, 3 Drawing Sheets

| FOREIGN PATENT DOCUMENTS | | |
|---|---|---|
| FR | 2868366 * | 10/2005 |
| FR | 2868366 A1 | 10/2005 |
| FR | 2885562 * | 11/2006 |
| FR | 2885562 A1 | 11/2006 |
| JP | 2003-70585 A | 3/2003 |

OTHER PUBLICATIONS

The UK Search Report dated Oct. 4, 2007 for corresponding GB Application No. 0612167.7 (1 pg.).

* cited by examiner

VEHICLE SEAT BACKS

This invention relates to improvements in or relating to vehicle seat backs, and in particular to a vehicle seat back tilt adjustment assembly and a vehicle seat including such an assembly.

BACKGROUND

Adjusting the position of a vehicle seat back, otherwise known as a vehicle seat backrest, allows a seat occupant to choose a comfortable seat back angle, and also allows altering of the available space behind a seat or on a seat. References herein to a "vehicle seat back" are intended to be synonymous with "vehicle seat backrest".

In many cases a seat back is secured to a vehicle body via a releasable latch and striker arrangement. The latch selectively engages with the striker to secure one to the other and, in turn, secure the position of the seat back relative to the vehicle body. Often the releasable latch is attached to the seat back while the striker is attached to the vehicle body, although the opposite arrangement is also possible.

The position of the striker relative to the vehicle body is fixed, and so such an arrangement provides the seat back with only one fixed angle of inclination.

DE 3 110 130 discloses an arrangement which includes a slidable latch pin that engages with any one of a number of apertures in a striker member.

Meanwhile EP 0 741 055 describes a latch pin and striker member arrangement which is pivotable so as to provide a seat back with two fixed angles of inclination.

In each of the aforementioned latch and striker arrangements it is necessary to disengage the latch from the striker in order to adjust the angle of inclination of the seat back, and necessary to engage the latch with the striker in order to secure the seat back in position.

Furthermore, a latch release member is often coupled via a linkage or cable with the latch to effect disengagement of the latch from the striker. Such arrangements are complex and occupy a large volume, as well as including apertures which can be unsightly and potential finger traps.

Therefore there is a need for improvements in or relating to vehicle seat backs which obviates the aforementioned difficulties.

SUMMARY

According to a first aspect of the invention there is provided a vehicle seat back tilt adjustment assembly comprising:
 a guide member securable to a vehicle body; and
 an intermediate mechanism moveably coupled to the guide member and including first and second locking elements, the first locking element being moveable between a first configuration in which it is engagable with a vehicle seat back to secure the seat back to the intermediate mechanism and a second configuration in which the seat back is disengagable therefrom to allow the seat back to move independently of the intermediate mechanism, and the second locking element selectively engaging the guide member to secure the position of the intermediate mechanism relative to the guide member.

Moveably coupling the intermediate mechanism to the guide member and providing a second locking element which is able to selectively engage the guide member to secure the position of the intermediate mechanism relative to the guide member, allows a user to make small adjustments to the inclination of a seat back without having to disengage the first locking element from the vehicle seat back.

The provision of a first locking element that is moveable between a first configuration in which it is engagable with a vehicle seat back to secure the seat back to the intermediate mechanism and a second configuration in which the seat back is disengagable therefrom to allow the seat back to move independently of the intermediate mechanism, allows a user to move the seat back through a large angle to, for example, allow access to the rear of a vehicle.

In addition, the foregoing arrangement is compact and so occupies only a small volume within a vehicle interior.

According to a second aspect of the invention there is provided a vehicle seat including a vehicle seat back tilt adjustment assembly as described above.

Such a vehicle seat shares the advantages of the vehicle seat back tilt adjustment assembly of the invention.

BRIEF DISCRIPTION OF THE DRAWINGS

There now follows a brief description of a preferred embodiment of the invention, by way of non-limiting example, with reference to the accompanying drawings in which.

DETAILED DESCRIPTION

Figure 1:
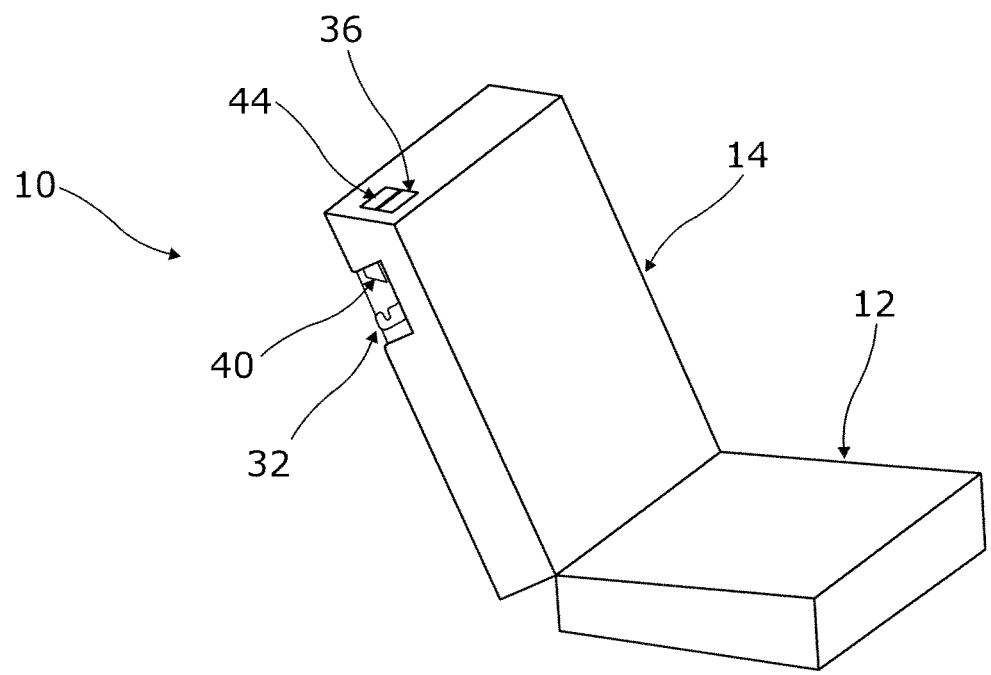
FIG. 1 shows a perspective view of a vehicle seat including a vehicle seat back tilt adjustment assembly according to a first embodiment of the invention in one configuration.

FIG. 1 shows a perspective view of a vehicle seat 10 including a seat cushion 12 and a seat back 14.

The seat 10 includes a vehicle seat back tilt adjustment assembly 20 according to a first embodiment of the invention.

The tilt adjustment assembly 20 includes a guide member 22, in the form of a track 24, which is secured to a vehicle body (not shown).

The tilt adjustment assembly 20 also has an intermediate mechanism 26 that includes first and second locking elements 28, 30. In other embodiments of the invention the intermediate mechanism may include a single, dual-function, locking element which provides the functionality set out below of the first and second locking elements 28, 30.

Figure 2:
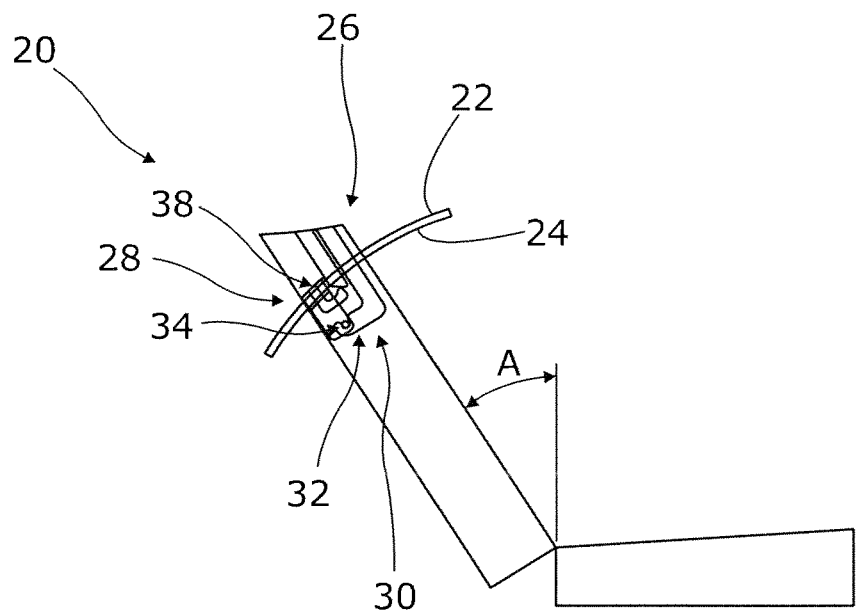
FIG. 2 shows an elevational view from a first side of the vehicle seat shown in FIG. 1.

The first locking element 28 includes a first latch 32 which is moveably secured within the seat back 14, and a striker 34 which is secured to the intermediate mechanism 26 and is engagable with the first latch 32, as shown in FIG. 2. In other embodiments of the invention (not shown) the striker may be secured to the seat back and the first latch may be moveably secured to the intermediate mechanism.

The first locking element 28 also includes a first release button 36 which is moveable between a first and second positions to move the first latch 32 in and out of engagement with the striker 34.

Figure 3:
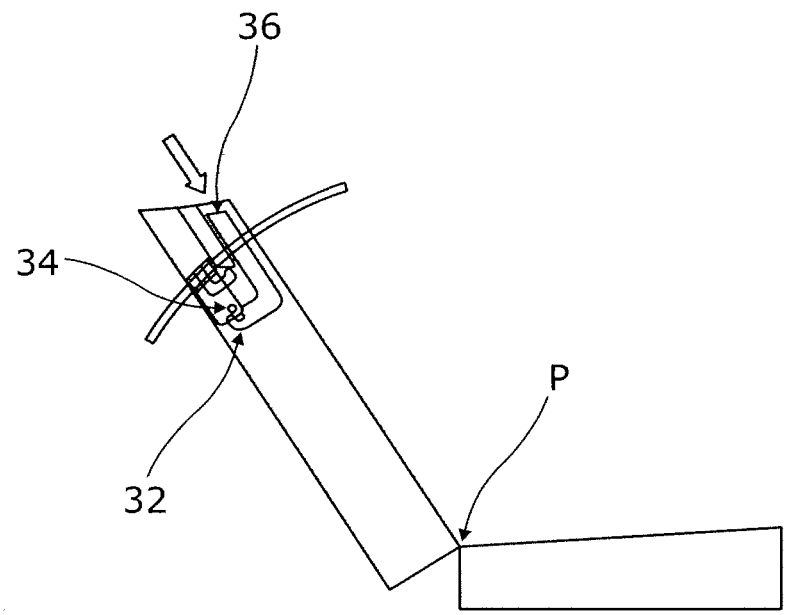
FIG. 3 shows an elevational view from the first side of the vehicle seat back tilt adjustment assembly shown in FIG. 1 in another configuration.
Figure 4:
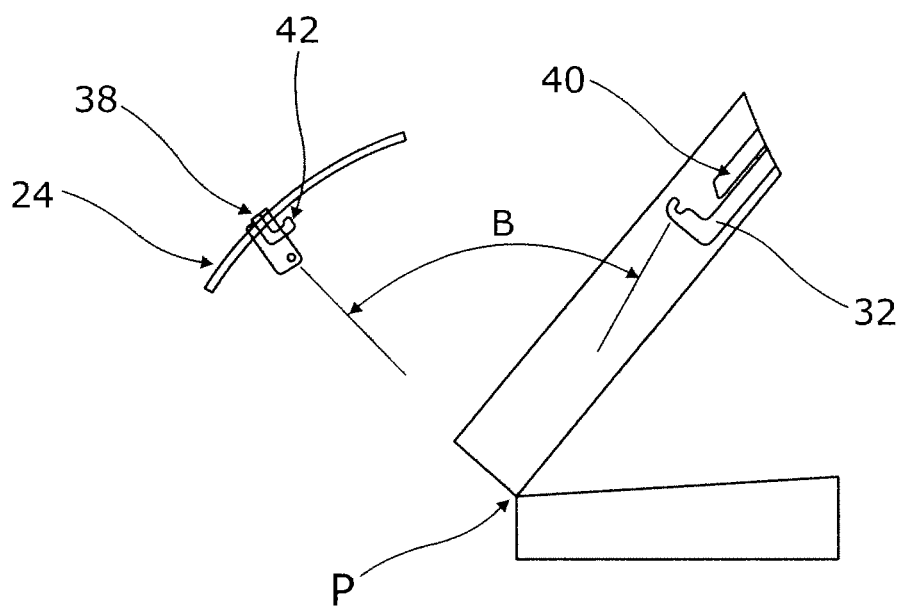
FIG. 4 shows the vehicle seat of FIG. 3 with a seat back in a forward position.

FIG. 2 (and FIGS. 5 and 6) shows the first latch 32 in engagement with the striker 34, while FIGS. 3 and 4 show the first latch 32 disengaged from the striker 34.

Figure 5:
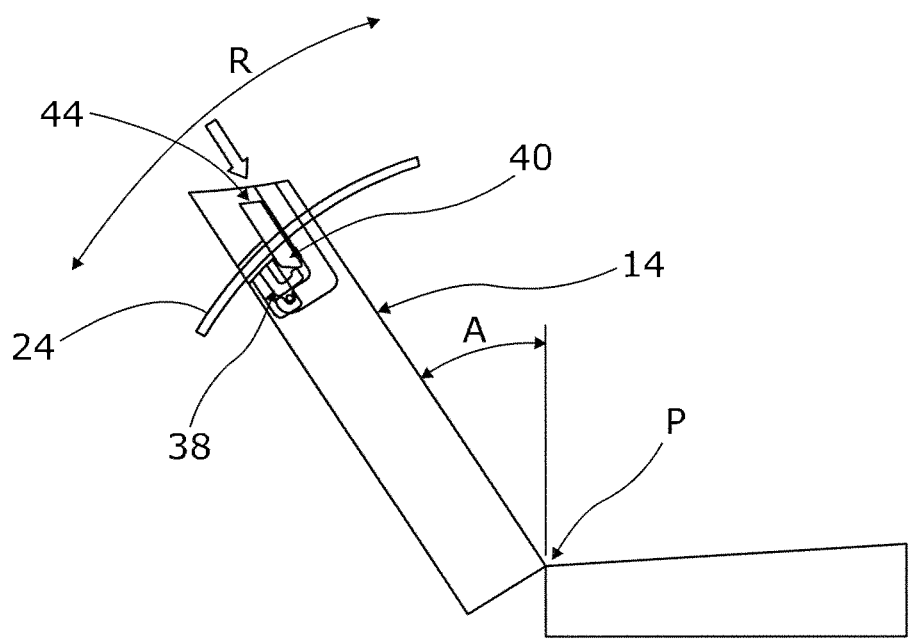
FIG. 5 shows an elevational view from the first side of the vehicle seat back tilt adjustment assembly shown in FIG. 1 in a further configuration.
Figure 6:
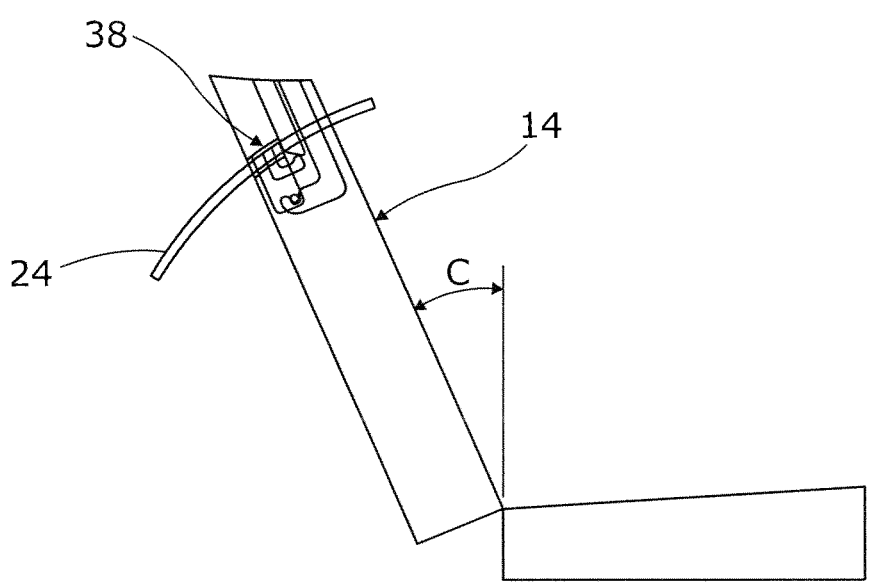
FIG. 6 shows an elevational view from the first side of the of the vehicle seat back tilt adjustment assembly shown in FIG. 1 in a still further configuration.

The second locking element 30 includes a second latch 38 that is engagable with the guide member 22. The second locking element 30 also includes a release actuator 40 that is moveable between first and second positions to selectively disengage the second latch 38 from the guide member 22, as shown in FIG. 5.

The second latch 38 includes a latch trigger 42 which abuts the release actuator 40 to cause movement of the second latch 38 away from the guide member 22 on movement of the release actuator 40.

The second latch 38 includes a latch trigger 40 which abuts the release actuator 40 to cause movement of the second latch 38 away from the guide member 22 on movement of the release actuator 40.

The release actuator 40 includes a second release button 44 which is moveable between first and second positions to selectively disengage the second latch 38 from the guide member 22.

In the embodiment shown, the first and second release buttons lie adjacent to one another, and are accessible from an exterior of the seat back 14. This allows a user to adjust the seat back, as desired, using only one hand.

The second locking element 30 is biased into engagement with the guide member 22 by a spring, and the second latch 38 includes a pin 46 which engages with the guide member 22 to selectively secure the position of the second locking element 30 relative to the guide member 22.

Other embodiments of the invention may include other forms of bias.

In addition, the latches, release buttons and track described above are illustrative only of the latching principle and do not depict actual design details which may vary in other embodiments of the invention.

In use, the first latch 32 engages with the striker 34 to secure the seat back 14 to the intermediate mechanism 26. The intermediate mechanism 26 is, in turn, secured in position relative to the track 24 via engagement of the second latch 38 with the track 24.

In this way the seat back 14 is secured at a first desired angle A, as shown in FIG. 2.

If a user desires to move the seat back 14 through a large angle to, for example, gain access to a rear of a vehicle, the user depresses the first release button 36 to move the first latch 32 out of engagement with the striker 34, as shown in FIG. 3. This allows a user to pivot the seat back through a large angle B, as shown in FIG. 4.

In this configuration, the release actuator 40 is spaced from the latch trigger 42 and so cannot disengage the second latch 38 from the guide member 22, thereby ensuring that the desired tilt of the seat back 14 remains set and the seat back 14 can readily be returned to its former position by moving it back through the large angle B.

Alternatively, if a user desires to adjust the tilt angle of the seat back 14 by a small amount to, for example, secure the seat back 14 at a more comfortable inclination, the user depresses the second release button 44 to move the release actuator 40 against the latch trigger 42. This moves the second latch 38 and corresponding pin 46 out of engagement with the track 24, as shown in FIG. 5. As a result the user is able to move the intermediate mechanism 26 so as to pivot the seat back 14 through a small angle, within a range R, to a more desired angle of inclination C, a shown in FIG. 6.

Releasing the second release button 44 allows the second latch 38 to be biased into engagement with the track 28, in a different position there along, to secure the position of the intermediate mechanism 26 relative to the track 28 and, in turn, secure the seat back 14 at the new angle of inclination C.

In this way the invention provides a vehicle seat back tilt adjustment assembly 20 which allows a first latch 32 and striker 34 to remain engaged while tilt adjustment of the seat back 14 is conveniently made by operating the second locking element 30, such operation being possible by the seat occupant or another person.

The invention claimed is:

1. A vehicle seat back tilt adjustment assembly comprising:
a guide member securable to a vehicle body; and
an intermediate mechanism moveably coupled to the guide member,
wherein the intermediate mechanism comprises first and second locking elements,
wherein the first locking element is configured to be moveable between a first configuration in which the first locking element is engagable with a vehicle seat back to secure the seat back to the intermediate mechanism and a second configuration in which the seat back is disengagable from the intermediate mechanism to allow the seat back to move independently of the intermediate mechanism and thereby allow a user to move the seat back through a large angle,
wherein the second locking element is configured to selectively engage the guide member to secure a position of the intermediate mechanism relative to the guide member and thereby allow the user to make small adjustments to an inclination of the seat back,
wherein the intermediate mechanism further comprises a first release button operable to move the first locking element into the second configuration, and a second release button operable to disengage the second locking element from the guide member, and
wherein the first and second release buttons lie adjacent to one another throughout a range of movement of the seat back, whereby the user is able with one hand to make large or small adjustments to a position of the seat back as desired.

2. A vehicle seat back tilt adjustment assembly according to claim 1 wherein the first locking element includes a first latch.

3. A vehicle seat back tilt adjustment assembly according to claim 2 wherein the first locking element further includes a striker secured to the intermediate mechanism and engagable with the first latch.

4. A vehicle seat back tilt adjustment assembly according to claim 3 wherein the first release button is configured to be moveable between first and second positions to move the first latch in and out of engagement with the striker, respectively.

5. A vehicle seat back tilt adjustment assembly according to claim 2, wherein the second locking element includes a second latch, the second latch being engagable with the guide member.

6. A vehicle seat back tilt adjustment assembly according to claim 5 wherein the second locking element includes a release actuator moveable between first and second positions to selectively disengage the second latch from the guide member.

7. A vehicle seat back tilt adjustment assembly according to claim 6 wherein the second latch includes a latch trigger abutable with the release actuator to cause movement of the second latch away from the guide member.

8. A vehicle seat back tilt adjustment assembly according to claim 6 wherein the first release button is configured to be moveable between first and second positions to move the first latch in and out of engagement with a striker, respectively; and wherein the second release button is configured to be moveable between first and second positions to selectively disengage the second latch from the guide member.

9. A vehicle seat back tilt adjustment assembly according to claim 1 wherein the first and second release buttons are accessible from an exterior of the seat back.

10. A vehicle seat back tilt adjustment assembly according to claim 1 wherein the second locking element is biased into engagement with the guide member.

11. A vehicle seat back tilt adjustment assembly according to claim 1 wherein the guide member includes a track.

12. A vehicle seat back tilt adjustment assembly according to claim 11 wherein the track and the second locking element include mutually engagable formations to selectively secure one of the track and the second locking element to the other of the track and the second locking element such that a position of the intermediate mechanism relative to the track is secured.

13. A vehicle seat back tilt adjustment assembly according to claim 12 wherein the second locking element includes a pin to selectively secure a position of the second locking element relative to the track.

14. A vehicle seat including a vehicle seat back tilt adjustment assembly according to claim 1.

15. A vehicle seat according to claim 14 wherein the first and second locking elements lie in the vehicle seat back.

* * * * *